United States Patent
Bonwick

(10) Patent No.: US 10,466,913 B2
(45) Date of Patent: Nov. 5, 2019

(54) METHOD AND SYSTEM FOR REPLICATING AND USING GRID LEVEL METADATA IN A STORAGE SYSTEM

(71) Applicant: EMC Corporation, Hopkinton, MA (US)

(72) Inventor: Jeffrey S. Bonwick, Santa Clara, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 141 days.

(21) Appl. No.: 14/699,594

(22) Filed: Apr. 29, 2015

(65) Prior Publication Data

US 2016/0320986 A1    Nov. 3, 2016

(51) Int. Cl.
*G06F 3/06* (2006.01)
*G06F 11/10* (2006.01)

(52) U.S. Cl.
CPC .......... *G06F 3/0619* (2013.01); *G06F 3/0644* (2013.01); *G06F 3/0688* (2013.01); *G06F 3/0689* (2013.01); *G06F 11/10* (2013.01); G06F 2003/0692 (2013.01)

(58) Field of Classification Search
CPC ...... G06F 3/0619; G06F 3/0644; G06F 3/688; G06F 3/0689; G06F 11/10; G06F 2003/0692
See application file for complete search history.

(56) References Cited

U.S. PATENT DOCUMENTS

| | | |
|---|---|---|
| 6,351,838 B1 | 2/2002 | Amelia |
| 6,415,355 B1 | 7/2002 | Hirofuji |
| 7,228,352 B1 * | 6/2007 | Yaguchi .............. G06F 11/1662 709/229 |
| 7,398,418 B2 | 7/2008 | Soran et al. |
| 7,406,621 B2 | 7/2008 | Lubbers et al. |
| 7,430,706 B1 | 9/2008 | Yuan et al. |
| 7,543,100 B2 | 6/2009 | Singhal et al. |
| 7,752,389 B1 | 7/2010 | Fan |
| 7,934,120 B2 | 4/2011 | Zohar et al. |
| 8,078,906 B2 | 12/2011 | Yochai et al. |
| 8,145,840 B2 | 3/2012 | Koul et al. |
| 8,200,887 B2 | 6/2012 | Bennett |

(Continued)

FOREIGN PATENT DOCUMENTS

| CN | 102667738 A | 9/2012 |
|---|---|---|
| CN | 103339609 A | 10/2013 |

(Continued)

OTHER PUBLICATIONS

Anvin, H., "The mathematics of RAID-6", retrieved from the internet at http://www.cs.utk.edu/"plank/plank/papers/CS-96-332.html, Jan. 20, 2004 (9 pages).

(Continued)

*Primary Examiner* — Masud K Khan
(74) *Attorney, Agent, or Firm* — Chamberlain, Hrdlicka, White, Williams & Aughtry

(57) ABSTRACT

In general, embodiments of the technology relate to a method and system protecting data in persistent storage. More specifically, various embodiments of the technology relate to using different replication schemes to protect different types of data within the persistent storage.

20 Claims, 10 Drawing Sheets

(56) References Cited

U.S. PATENT DOCUMENTS

| | | | |
|---|---|---|---|
| 8,316,260 B1* | 11/2012 | Bonwick | G06F 11/1096 |
| | | | 711/114 |
| 8,327,185 B1 | 12/2012 | Bonwick | |
| 8,464,095 B1* | 6/2013 | Bonwick | G06F 11/1088 |
| | | | 714/6.2 |
| 8,554,997 B1 | 10/2013 | Bonwick et al. | |
| 8,560,772 B1 | 10/2013 | Piszczek et al. | |
| 8,861,123 B1* | 10/2014 | Ooi Huat Lye | G11B 5/024 |
| | | | 360/57 |
| 8,977,942 B2 | 3/2015 | Wu et al. | |
| 9,021,183 B2 | 4/2015 | Matsuyama et al. | |
| 9,152,499 B1 | 10/2015 | Mollov et al. | |
| 2002/0161972 A1 | 10/2002 | Talagala et al. | |
| 2004/0153961 A1 | 8/2004 | Park et al. | |
| 2004/0177219 A1 | 9/2004 | Meehan et al. | |
| 2004/0225926 A1 | 11/2004 | Scales et al. | |
| 2005/0166083 A1 | 7/2005 | Frey et al. | |
| 2005/0223156 A1 | 10/2005 | Lubbers et al. | |
| 2006/0085594 A1 | 4/2006 | Roberson et al. | |
| 2008/0109602 A1 | 5/2008 | Ananthamurthy et al. | |
| 2008/0168225 A1 | 7/2008 | O'Connor | |
| 2009/0187786 A1 | 7/2009 | Jones et al. | |
| 2010/0199125 A1 | 8/2010 | Reche | |
| 2012/0079189 A1* | 3/2012 | Colgrove | G06F 3/0605 |
| | | | 711/114 |
| 2012/0079318 A1 | 3/2012 | Colgrove et al. | |
| 2012/0089778 A1 | 4/2012 | Au et al. | |
| 2012/0166712 A1 | 6/2012 | Lary | |
| 2014/0156966 A1* | 6/2014 | Ellis | G06F 3/064 |
| | | | 711/173 |
| 2016/0110249 A1* | 4/2016 | Orme | G06F 3/0619 |
| | | | 714/6.24 |

FOREIGN PATENT DOCUMENTS

| | | | | |
|---|---|---|---|---|
| CN | 104272261 A | 1/2015 | | |
| CN | 104272274 A | 1/2015 | | |
| EP | 1577774 A2 | 9/2005 | | |
| JP | 2004-326759 A | 11/2004 | | |
| JP | 2010-508604 A | 3/2010 | | |
| WO | 2008054760 A2 | 5/2008 | | |
| WO | WO 2011044515 A2 * | 4/2011 | | G06F 11/1092 |

OTHER PUBLICATIONS

Kazmi, A., "PCI Express™ Basics & Applications in Communication Systems," PCI-SIG Developers Conference, 2004 (50 pages).

Percival, D., "Multicast Over PCT Express®," PCI-SIG Developer's Conference Europe, 2009 (33 pages).

Huffman, A., NVM Express Revision 1.0b, Jul. 12, 2011 (126 pages).

Regula, J., Using Non-transparent Bridging in PCI Express Systems, Jun. 1, 2004 (31 pages).

Minoru Uehara, Orthogonal RAID with Multiple Parties in Virtual Large-Scale Disks, IPSJ SIG Technical Report, vol. 2011-DPS-149 No. 4, Nov. 24, 2011 [CD-ROM], IPSJ, Nov. 24, 2011, pp. 1-8 (8 pages).

Office Action in corresponding Japanese application 2015-501902 dated Oct. 6, 2015 (6 pages).

International Search Report in corresponding International Application No. PCT/US2013/033224 dated Oct. 2, 2014 (3 pages).

Written Opinion of the International Searching Authority issued in PCT/US2013/033224 dated Oct. 2, 2014 (10 pages).

Notification of First Office Action and English translation, issued in corresponding CN201610200533.3 application, dated Jul. 4, 2018. (25 pages).

* cited by examiner

|  |  |  |
|---|---|---|
| <1,3,4> | <2,3,4> | <3,3,4> |
| <1,2,4> | <2,2,4> | <3,2,4> |
| <1,1,4> | <2,1,4> | <3,1,4> |

↑ IFD 2, → IFD 1

} P Parity RAID Grid 406

Value for <1,1,4> RAID grid location =
*f* (value at <1,1,1>, value at <1,1,2>, value at <1,1,3>)

|  |  |  |
|---|---|---|
| <1,3,5> | <2,3,5> | <3,3,5> |
| <1,2,5> | <2,2,5> | <3,2,5> |
| <1,1,5> | <2,1,5> | <3,1,5> |

↑ IFD 2, → IFD 1

} Q Parity RAID Grid 408

Value for <1,1,5> RAID grid location =
*f* (value at <1,1,1>, value at <1,1,2>, value at <1,1,3>)

METHOD AND SYSTEM FOR REPLICATING AND USING GRID LEVEL METADATA IN A STORAGE SYSTEM

BACKGROUND

In order to protect against potential loss of data in a storage system, it is often advantageous to implement a replication scheme.

DETAILED DESCRIPTION

Figure 1:
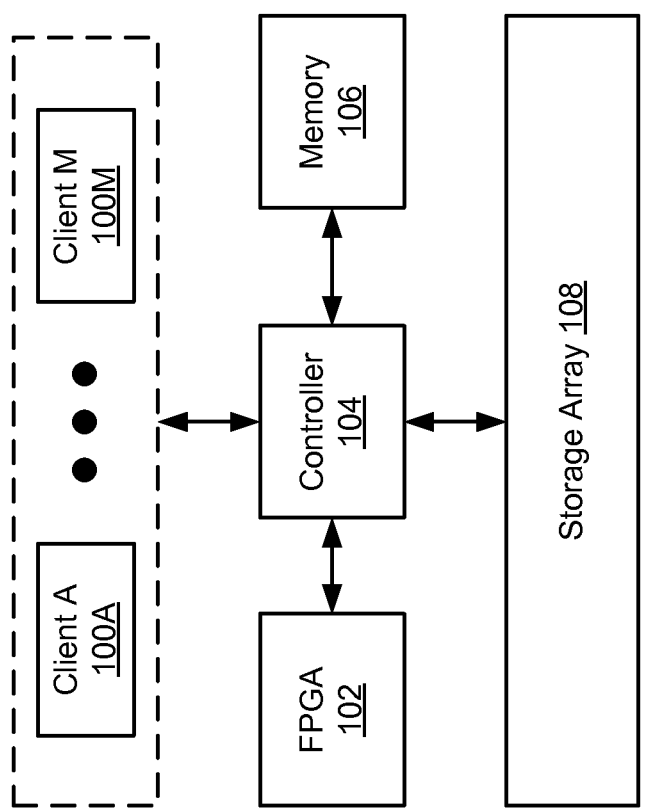
FIG. 1 shows a system in accordance with one embodiment of the technology.

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-9, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system protecting data in persistent storage. More specifically, embodiments of the technology relate to using different replication schemes to protect different types of data within the persistent storage. In one embodiment of the technology, a multi-dimensional RAID scheme (e.g., 2D RAID scheme, a 3D RAID scheme, etc.) is used to protect user data (e.g., client data, block-level metadata, and parity data) and a replication scheme (e.g., labels) is used to protect grid-level metadata (e.g., grid geometry, bad location information, and P/E count). Additional detail with respect to grid-level metadata, including grid geometry, bad location information, P/E count, is provided below with respect to FIGS. 5A, 5B, and 5C.

In one embodiment of the technology, using a 2D RAID scheme, the user data stored within a RAID grid implementing such a RAID scheme may be recovered when there are more than two errors in a given RAID stripe. Similarly, using a 3D RAID scheme, the user data stored within a RAID cube implementing such a RAID scheme may be recovered when there are more than two errors in a given RAID stripe. Further, in various embodiments of the technology, all user data may be recovered when there is a failure in more than one independent fault domain (IFD). In one embodiment of the technology, the grid-level metadata is required to implement the multi-dimensional RAID scheme. More specifically, the grid-level metadata may include, but is not limited to, information about the grid dimensions, the number of parity values used in the multi-dimensional RAID scheme, and the location of the parity values. The aforementioned information may be required to implement the multi-dimensional RAID scheme.

In one or more embodiments of the technology, an IFD corresponds to a failure mode that results in the data at a given location being inaccessible. Each IFD corresponds to an independent mode of failure in the storage array. For example, if the data is stored in NAND flash, where the NAND flash is part of a storage module (which may also be referred to in some embodiments as a flash module) (which includes multiple NAND dies), then the IFDs may be (i) storage module, (ii) channel (i.e., the channel used by the flash controller (not shown) in the storage module to write data to the NAND flash), and (iii) NAND die.

For purposes of this technology, the term "RAID" as used herein refers to "Redundant Array of Independent Disks." While "RAID" refers to any array of independent disks, embodiments of the technology may be implemented using any type of persistent storage device where the RAID grid locations may be distributed across one or more persistent storage devices based on the implementation of the technology.

FIG. 1 shows a system in accordance with one embodiment of the technology. As shown in FIG. 1, the system includes one or more clients (100A, 100M), a controller (104), memory (106), an FPGA (102) (which may be optionally present), and a storage array (108).

In one embodiment of the technology, a client (100A, 100M) is any system or process executing on a system that includes functionality to issue a read request or a write request to the controller (104). In one embodiment of the technology, the clients (100A, 100M) may each include a processor (not shown), memory (not shown), and persistent storage (not shown). In one embodiment of the technology, the controller (104) is configured to implement the methods shown in FIGS. 8-9. Further, the controller includes functionality to store user data (see e.g., FIG. 5A, 501) in accordance with a multi-dimensional RAID scheme, which includes writing data to the storage array in a manner consistent with the multi-dimensional RAID scheme (see e.g., FIGS. 2-4D) and reading data (including reconstructing data) from the storage array in a manner consistent with the multi-dimensional RAID scheme (see e.g., FIGS. 2-4D). In one embodiment of the technology, the controller (104) includes a processor configured to execute instructions to implement one or more embodiments of the technology, where the instructions are stored on a non-transitory computer readable medium (not shown) that is located within, or that is operatively connected to, the controller (104). Alternatively, the controller (104) may be implemented using hardware. Those skilled in the art will appreciate that the controller (104) may be implemented using any combination of software and/or hardware.

In one embodiment of the technology, the controller (104) is operatively connected to the memory (106). The memory (106) may be any volatile memory or non-volatile memory including, but not limited to, Dynamic Random-Access Memory (DRAM), Synchronous DRAM, SDR SDRAM, and DDR SDRAM. In one embodiment of the technology, the memory (106) is configured to temporarily store various data (including parity data) (see e.g., data described in FIG. 7) prior to such data being stored in the storage array.

In one embodiment of the technology, the FPGA (102) (if present) includes functionality to calculate P and/or Q parity values for purposes of storing data in the storage array (108) and/or functionality to perform various calculations necessary to recover corrupted or missing data stored using the multi-dimensional RAID scheme. In one embodiment of technology, the FPGA may include functionality to perform all or a portion of the methods described in FIGS. 8 and 9. The controller (104) may use the FPGA (102) to offload the processing of various data in accordance with one or more embodiments of the technology.

In one embodiment of the technology, the storage array (108) includes a number of individual persistent storage devices including, but not limited to: magnetic memory devices, optical memory devices, solid state memory devices, phase change memory devices, any other suitable type of persistent memory device, or any combination thereof. In one embodiment of the technology, each storage array (108) may include a number of storage modules where each storage module includes solid state memory and a storage module controller. In such embodiments the storage module controller includes functionality to receive pages from the controller and write the pages to the corresponding physical locations in the solid state memory. Further, the storage module controller may include functionality to generate the error-correcting codes (ECC) for each page prior to the page being written to the solid state memory. In addition, the storage module controller may include functionality to reconstruct pages in accordance with the multi-dimensional RAID scheme.

Those skilled in the art will appreciate that while FIG. 1 shows an FPGA, the technology may be implemented without an FPGA. Further, those skilled in the art will appreciate that other components may be used in place of the FPGA without departing from the technology. For example, the technology may be implemented using an ASIC(s), a graphics processing unit(s) (GPU), a general purpose processor(s), any other hardware device capable of calculating P and/or Q parity values for purposes of storing data in the storage array and/or performing various calculations necessary to recover corrupted data stored using the multi-dimensional RAID scheme, any devices that includes a combination of hardware, firmware, and/or software configured to calculate P and/or Q parity values for purposes of storing data in the storage array (108) and/or to perform various calculations necessary to recover corrupted data stored using the multi-dimensional RAID scheme, or any combination thereof.

Figure 2:
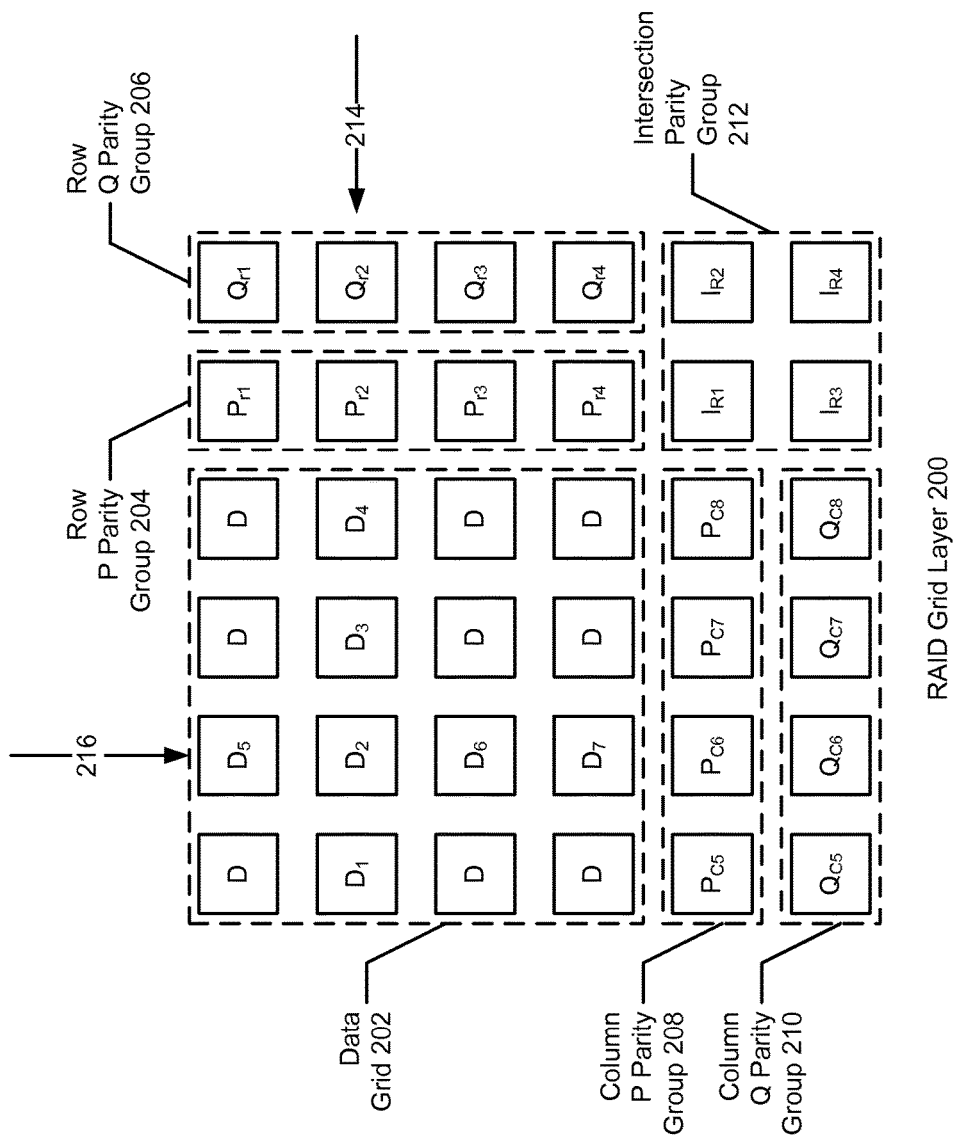
FIG. 2 shows a RAID grid layer in accordance with one embodiment of the technology.

In one embodiment of the technology, if the controller implements a 2D RAID scheme or a 3D RAID scheme (see FIG. 3), the controller stores data in RAID grid, where the RAID grid includes a set of RAID grid layers (see e.g., FIG. 2, 200). The RAID grid includes a set of RAID grid locations, where each RAID grid location is associated with a block. Further, each block is associated with a set of pages.

For example, consider a scenario in which there is a 4×4 RAID grid and that each RAID grid location in the RAID grid is associated with a block that includes 256 pages. In such a scenario, the RAID grid may be composed of up to 255 RAID grid layers (see e.g., FIG. 2, 200), where each RAID grid layer includes 16 pages (i.e., one page from each of the blocks associated with the RAID grid). The remaining page in each of the 16 blocks (i.e., the blocks associated with the RAID grid) is used to store the label (see e.g., FIG. 5, 508).

Continuing with the example, if the RAID grid is associated with a first IFD=storage module (SM) in a first dimension and a second IFD=channel (CH) in a second dimension, the physical addresses for each of the 16 pages in a given RAID grid layer may be denoted as follows:

TABLE 1

Physical Addresses in RAID grid layer

| RAID Grid Layer Location in RAID Grid Layer | Physical Address in Storage Pool |
| --- | --- |
| 0 | <SM0, CH0, CE, LUN, plane, block, page> |
| 1 | <SM1, CH0, CE, LUN, plane, block, page> |
| 2 | <SM2, CH0, CE, LUN, plane, block, page> |
| 3 | <SM3, CH0, CE, LUN, plane, block, page> |
| 4 | <SM0, CH1, CE, LUN, plane, block, page> |
| 5 | <SM1, CH1, CE, LUN, plane, block, page> |
| 6 | <SM2, CH1, CE, LUN, plane, block, page> |
| 7 | <SM3, CH1, CE, LUN, plane, block, page> |
| 8 | <SM0, CH2, CE, LUN, plane, block, page> |
| 9 | <SM1, CH2, CE, LUN, plane, block, page> |
| 10 | <SM2, CH2, CE, LUN, plane, block, page> |
| 11 | <SM3, CH2, CE, LUN, plane, block, page> |
| 12 | <SM0, CH3, CE, LUN, plane, block, page> |
| 13 | <SM1, CH3, CE, LUN, plane, block, page> |
| 14 | <SM2, CH3, CE, LUN, plane, block, page> |
| 15 | <SM3, CH3, CE, LUN, plane, block, page> |

As shown in the above table, the chip enable (CE), the logical unit (LUN), the plane, block, and page are the same for each page in a given RAID grid layer. Further, within different RAID grid layers of a given RAID grid, the chip enable (CE), the logical unit (LUN), the plane, and the block remain constant while the page number changes. For example, pages in a first RAID grid layer in a RAID grid may correspond to pages with physical addresses that include <block 37, page 1> while pages in a second RAID grid layer in the same RAID grid may include physical addresses that include <block 37, page 2>. Said another way, in one embodiment of the technology, the block specified in the physical address for all pages in the RAID grid is the same while the page specified in the physical address for pages within the RAID grid is the same for all pages in a given RAID grid layer but is different for pages associated with other RAID grid layers.

FIG. 2 shows a RAID grid layer in accordance with one embodiment of the technology. More specifically, FIG. 2 shows the conceptual portions of a RAID grid layer in accordance with one or more embodiments of the technology. The RAID grid layer (200) includes a number of RAID grid layer locations, where each RAID grid layer location ultimately corresponds to page in the storage array that is associated with a physical address.

Turning to the structure of the RAID grid layer, each RAID grid layer (200) includes: (i) a data grid (202), which includes RAID grid layer locations that store client data received from the client (i.e., data that the client has instructed the controller to write to the storage array); (ii) a row P parity group (204), which includes the RAID grid layer locations that store in the P parity values calculated using data in RAID grid layer locations in a row (described below); (iii) a row Q parity group (206), which includes the RAID grid layer locations that store in the Q parity values calculated using data in RAID grid layer locations in a row (described below); (iv) a column P parity group (208), which includes the RAID grid layer locations that store in the P parity values calculated using data in RAID grid layer locations in a column (described below); (v) a column Q parity group (210), which includes the RAID grid layer locations that store in the Q parity values calculated using data in RAID grid layer locations in a column (described below); and (vi) an intersection parity group (212), which includes parity values calculated using (a) data from RAID grid layer locations in row P parity group (204), (b) data from RAID grid layer locations in row Q parity group (206), (c) data from RAID grid layer locations in column P parity group (208), and (d) data from RAID grid layer locations in column Q parity group (210) (described below).

Referring to row (214), in one embodiment of the technology, the parity value stored in RAID grid layer location denoted as $P_{r2}$ in row (214) is calculated by applying a P parity function to all RAID grid layer locations in the row (214) that include data (e.g., $P_{r2}=f_P (D_1, D_2, D_3, D_4)$). Similarly, in one embodiment of the technology, the parity value stored in RAID grid layer location denoted as $Q_{r2}$ in row (214) is calculated by applying a Q parity function to all RAID grid layer locations in the row (214) that include data (e.g., $Q_{r2}=f_Q (D_1, D_2, D_3, D_4)$).

Referring to column (216), in one embodiment of the technology, parity value stored in the RAID grid layer location denoted as $P_{c6}$ in column (216) is calculated by applying a P parity function to all RAID grid layer locations in the column (216) that include data (e.g., $P_{C6}=f_P (D_5, D_2, D_6, D_7)$). Similarly, in one embodiment of the technology, data stored in the RAID grid layer location denotes by $Q_{C6}$ in column (216) is calculated by applying a Q parity function to all RAID grid layer locations in the column (216) that include data (e.g., $Q_{C6}=f_Q (D_5, D_2, D_6, D_7)$).

Referring to the intersection parity group (212), in one embodiment of the technology, the data stored in the RAID grid layer location denoted as $I_{r1}$ may be calculated by applying a P parity function to all RAID grid layer locations in the row P Parity Group (204) or by applying a P parity function to all RAID grid layer locations in the column P Parity Group (208). For example, $I_{r1}=f_P (P_{r1}, P_{r2}, P_{r3}, P_{r4})$ or $I_{r1}=f_P (P_{c5}, P_{c6}, P_{c7}, P_{c8})$.

In one embodiment of the technology, the data stored in the RAID grid layer location denoted as $I_{r2}$ may be calculated by applying a P parity function to all RAID grid layer locations in the row Q Parity Group (204) or by applying a Q parity function to all RAID grid layer locations in the column P Parity Group (208). For example, $I_{r2}=f_P (Q_{r1}, Q_{r2}, Q_{r3}, Q_{r4})$ or $I_{r2}=f_Q (P_{c5}, P_{c6}, P_{c7}, P_{c8})$.

In one embodiment of the technology, the data stored in the RAID grid layer location denoted as $I_{r3}$ may be calculated by applying a P parity function to all RAID grid layer locations in the column Q Parity Group (210) or by applying a Q parity function to all RAID grid layer locations in the row P Parity Group (204). For example, $I_{r3}=f_P (Q_{c5}, Q_{c6}, Q_{c7}, Q_{c8})$ or $I_{r3}=f_Q(P_{r1}, P_{r2}, P_{r3}, P_{r4})$.

In one embodiment of the technology, the data stored in the RAID grid layer location denoted as $I_{r4}$ may be calculated by applying a Q parity function to all RAID grid layer locations in the column Q Parity Group (210) or by applying a Q parity function to all RAID grid layer locations in the row Q Parity Group (206). For example, $I_{r4}=f_Q (Q_{r1}, Q_{r2}, Q_{r3}, Q_{r4})$ or $I_{r4}=f_Q (Q_{c5}, Q_{c6}, Q_{c7}, Q_{c8})$.

In one embodiment of the technology, the P and Q parity functions used to calculate the values for all of the parity groups may correspond to any P and Q parity functions used to implement RAID 6.

As discussed above, the RAID grid layer (200) shown in FIG. 2 represents the conceptual layout of a RAID grid layer. However, when the individual RAID grid layer locations are written to the storage array, the relative locations of the various RAID grid layer locations may vary across a row and/or a column. For example, referring to row (214), when the RAID grid layer locations within row (214) are written to the storage array, the relative locations of RAID grid layer locations that include user data (denoted by "D") and the RAID grid layer locations that include parity data (i.e., the RAID grid layer locations denoted as "$P_r$" and "$Q_r$") may be as follows: $<D_1, D_2, P_{r2}, D_3 Q_{r2}, D_4>$, $<P_{r2}, Q_{r2}, D_1, D_2, D_3, D_4>$, or any other arrangement within row (214). Similarly, referring to column (216), the relative location of RAID grid layer locations that include user data (denoted by "D") and the RAID grid layer locations that include parity data (i.e., the RAID grid layer locations denoted as "$P_c$" and "$Q_c$") may be as follows: $<D_5, D_2, D_6, P_{c6}, D_7, Q_{c6}>$, $<P_{c6}, D_5, D_2, Q_{c6}, D_6, D_7>$, or any other arrangement within column (216).

In one embodiment of the technology, the location of each of (i) the row P parity group, (ii) the row Q parity group, (iii) the column P parity group, and (iv) the column Q parity group may vary based on the implementation of the technology. Further, in such embodiments, the location of the intersection parity group is determined based on the locations of the aforementioned parity groups.

Continuing with the discussion of FIG. 2, the controller (or another entity in the system) may determine to which physical address in the storage array the data that is associated with each RAID grid layer location is written. This determination may be made prior to receiving any of the client data (which is part of the user data denoted as "D") for a particular RAID grid (or RAID grid layer) from the client. Alternatively, the determination may be made prior to writing the any data associated with the RAID grid layer locations to the storage array.

In one embodiment of the technology, the 2D RAID scheme as described in FIG. 2 is used to protect the user data (see e.g., FIG. 5, 501) (or portions thereof) within the pages of each of the RAID grid layer that makeup the RAID grid.

Those skilled in the art will appreciate that while FIG. 2 shows a RAID grid layer that is 6×6, the RAID grid layer may be implemented using any other dimensions without departing from the technology. Further, while FIG. 2 only shows a single RAID grid layer of a RAID grid, the RAID dimensions of the each of the RAID grid layers that make up the RAID grid are the same. For example, a RAID grid may be composed of 255 RAID grid layers all with the same dimensions. Further, the locations of the parity data within the individual RAID grid layers may be the same across all RAID grid layers within a RAID grid or, alternatively, the parity data may be in different locations in different RAID grid layers within the RAID grid.

In one embodiment of the technology, the P parity value is a Reed-Solomon syndrome and, as such, the P Parity function may correspond to any function that can generate a Reed-Solomon syndrome. In one embodiment of the technology, the P parity function is an XOR function.

In one embodiment of the technology, the Q parity value is a Reed-Solomon syndrome and, as such, the Q Parity function may correspond to any function that can generate a Reed-Solomon syndrome. In one embodiment of the technology, a Q parity value is a Reed-Solomon code. In one embodiment of the technology, $Q=g^0 \cdot D_0 + g^1 \cdot D_1 + g^2 \cdot D_2 + \ldots + g^{n-1} \cdot D_{n-1}$, where Q corresponds to any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID grid layer shown in FIG. 2 includes P and Q parity for each row and column, embodiments of the technology may be implemented using greater or fewer parity values without departing from the technology. For example, each row and column may only include a P parity value. In another example, each row and column may include three parity values. The aforementioned examples are not intended to limit the technology. In one embodiment of the technology, regardless of the number of parity values used in the implementation of the technology, each of the parity values is a Reed-Solomon syndrome.

Figure 3:
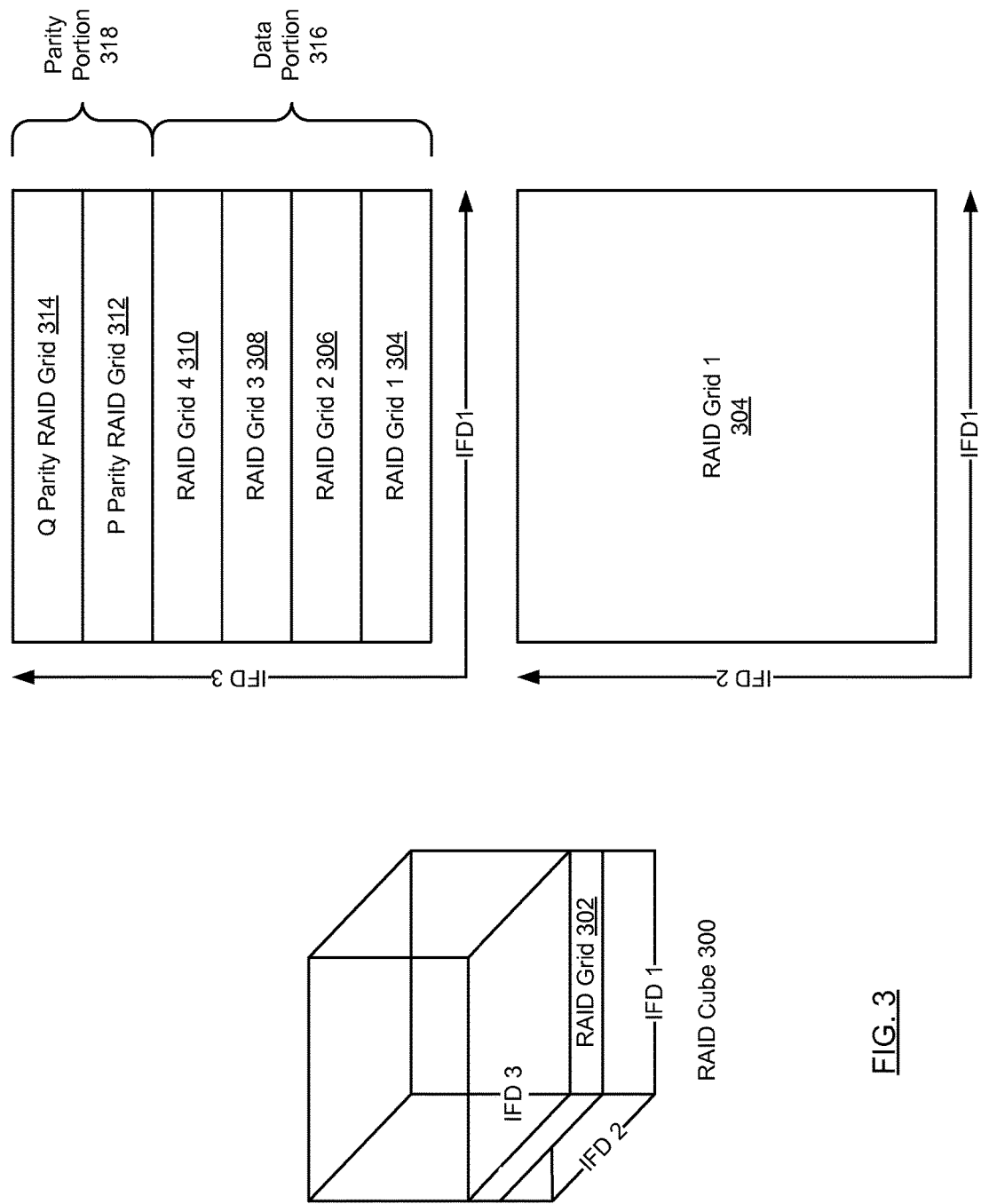
FIG. 3 shows a RAID cube and various views of the RAID cube in accordance with one embodiment of the technology.

FIG. 3 shows a RAID cube and various views of the RAID cube in accordance with one embodiment of the technology. As shown in FIG. 3, a RAID cube (300) corresponds to a conceptual stack of RAID grids (302). As discussed above, the controller (or another entity in the system) selects the physical addresses within the storage array in which to store the data (including user data and labels) for each of the RAID grid locations. In one embodiment of the technology, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 3, the data associated with each RAID grid location (e.g., data in a block, see FIG. 5, 500) for a given RAID grid (302, 304) is written to a set of physical address (or will be written to a set physical address) in the storage array (not shown) that is selected using a unique pair of values from IFD 1 and IFD 2, but has the same value for IFD 3. For example, if the data (i.e., user data and labels) in the storage array is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID grid, the data associated with each RAID grid location is written to a unique combination of storage module (IFD 1) and channel (IFD 2) but is written to the same NAND die (on each of the storage modules). Those skilled in the art will appreciate that the technology is not limited to the three independent fault domains described above. Further, those skilled in the art will appreciate that the technology is not limited to a storage array that includes NAND flash.

Continuing with FIG. 3, as discussed above, the RAID cube (300) is conceptual stack of RAID grids. More specifically, in one embodiment of the technology, the RAID cube (300) may include (i) a data portion (316), which includes two or more RAID grids (304, 306, 308, 310) and a parity portion (318) that includes a P parity RAID grid (312) and a Q parity RAID grid (314).

In one embodiment of the technology, the RAID grids (304, 306, 308, 310) in the data portion (316) include parity data (e.g., P-parity values or Q-parity values), which allows data within the RAID grid to be recovered using only data (including parity data) within the RAID grid. In one embodiment of the technology, the RAID cube is arranged such that data associated with a given RAID grid location in a given RAID grid (304, 306, 308, 310) may be recovered using data (including parity data) from other RAID grids (i.e., RAID grids in both the data portion (316) and the parity portion (318)). In one embodiment of the technology, the parity portion (318) of the RAID cube enables such a recovery mechanism.

In one embodiment of the technology, the P parity RAID grid (312) is the same dimension as the underlying RAID grids (304, 306, 308, 310), where the data stored in the block associated with each RAID grid location within the P Parity RAID grid is calculated by applying a P parity function (e.g., an XOR function) to data (including parity data) from blocks in the RAID grids in the data portion (316) (see e.g., FIGS. 4A-4D) Similarly, the Q parity RAID grid (314) is the same dimension as the underlying RAID grids (304, 306, 308, 310), where the data stored in the blocks associated with each RAID grid location within the Q Parity RAID grid is calculated by applying a Q parity function to data (including parity data) from the RAID grids in the data portion (316) (see e.g., FIGS. 4A-4D).

FIGS. 4A-4D show an example of populating a RAID cube in accordance with one or more embodiments of the technology. The example is not intended to limit the scope of the technology.

Figure 4A:
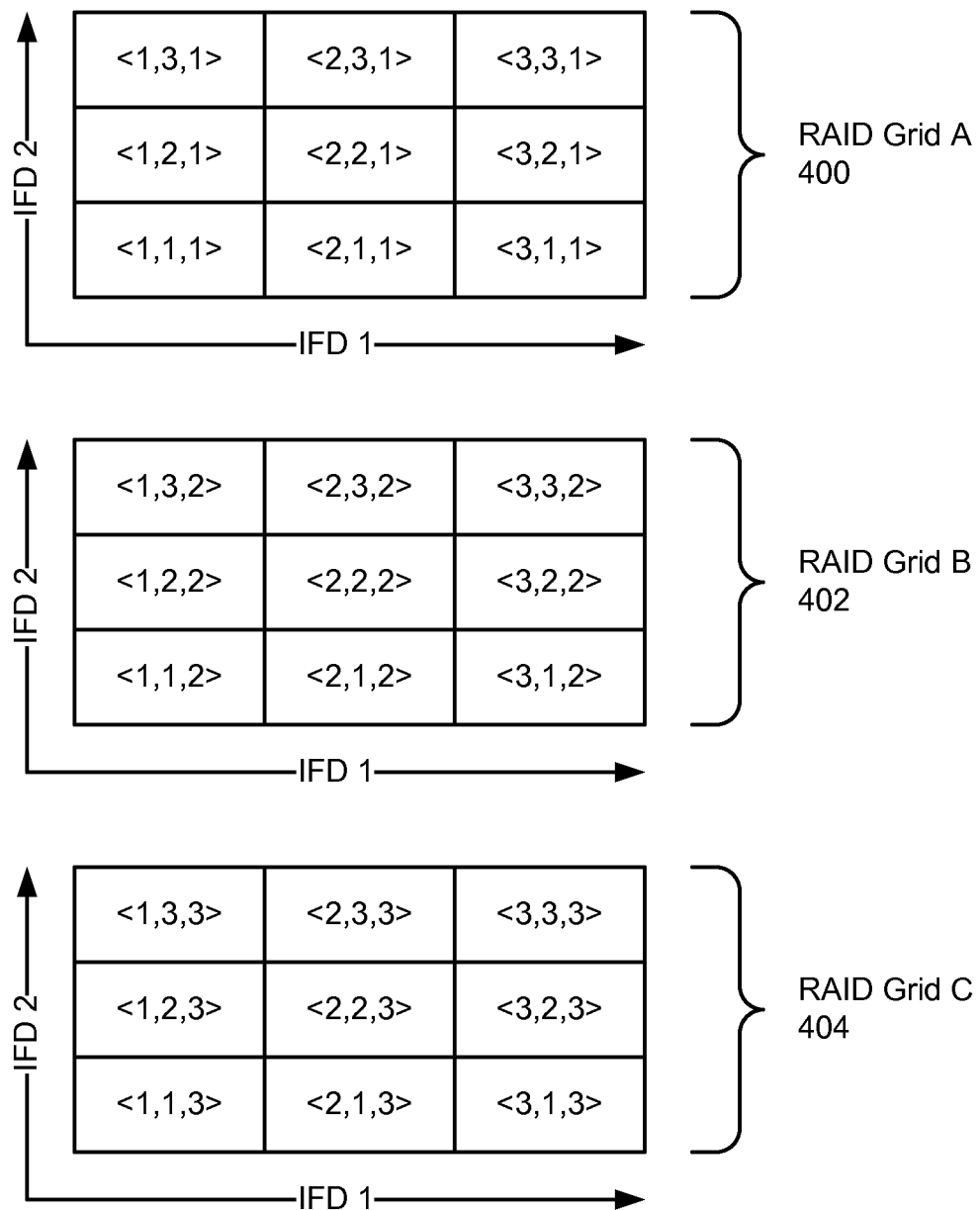
FIGS. 4A-4D show an example of a RAID cube in accordance with one or more embodiments of the technology.
Figures 4B, 4C, 4D:
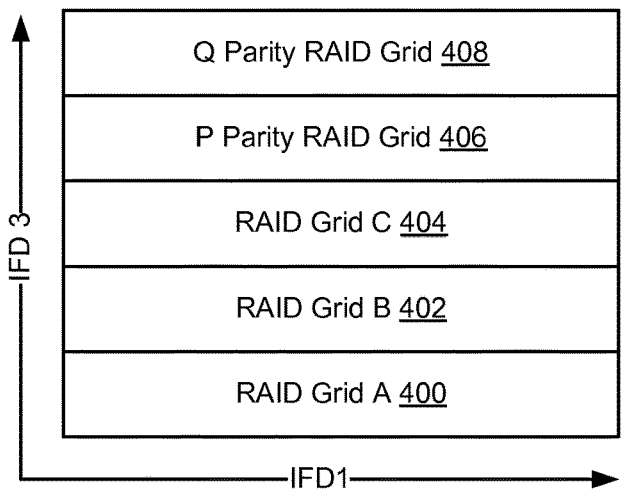

Consider the RAID cube depicted in FIG. 4D, which includes RAID grid A (400) RAID grid B (402), RAID grid C (404), P parity RAID grid (406), and Q parity RAID grid (408). Further, each RAID grid (400, 402, 404, 406, 408) in the RAID cube includes RAID grid locations that are written across IFD 1 and IFD 2 but have a constant value of IFD 3. Accordingly, in one embodiment of the technology, data (on one or more pages) in a block associated with a RAID grid location (the "target RAID grid location") in a RAID grid may be recovered using (i) only data stored in blocks associated with RAID grid locations in the row or column in which the target RAID grid location is located; (ii) using data stored in blocks associated with any RAID grid location within the RAID grid in which the target RAID grid location is located; or (iii) using data stored in blocks associated with any RAID grid location within the RAID cube in which the target RAID grid location is located. Said another way, in one embodiment of the technology, the arrangement of the data and parity values within the RAID grid and/or RAID cube allows data (on one or more pages) in a block associated with a target RAID grid location to be recovered when there are more than two errors in each of the row and column in which the target RAID grid location is located.

Referring to FIG. 4A, FIG. 4A includes three RAID grids (400, 402, 404), which make up the data portion of the RAID cube. Each of the RAID grid locations in each of the RAID grids (400, 402, 404) includes a 3-tuple defining the location in the storage array in which the data in the RAID grid location is written. In this example, the elements in the 3-tuple correspond to IFDs as follow: <IFD1, IFD2, IFD3>. The 3-tuples illustrate how the locations in the storage array are selected across the various IFDs. In particular, each of the RAID grid locations in RAID grid A includes a unique combination of IFD1 and IFD2, but the same value for IFD3. For example, if IFD 1 is a storage module, IFD2 is a channel, and IFD3 is a NAND die, then 3-tuple <4, 2,1> indicates that the data (on one or more pages) in a block associated with a particular RAID grid location will be written to physical addresses located in NAND die 1 in storage module 4 using Channel 2. Similarly, the 3-tuple <2, 3, 1> indicates that the data (on one or more pages) in a block associated with a particular RAID grid location will be written to physical addresses in NAND 1 in storage module 2 using Channel 3.

RAID grid B (402) and RAID grid C (404) are arranged in a similar manner to RAID grid A (400). However, the value for IFD3 in the 3-tuples for RAID grid locations in RAID grid B (402) is different than the value of IFD3 in the 3-tuples for RAID grid locations for RAID grid A (400). Further, the value for IFD3 in the 3-tuples for RAID grid locations for RAID grid C (404) is different than the value of IFD3 in the 3-tuples for RAID grid locations for RAID grid A (400) and for RAID grid B (402).

Referring to FIG. 4B, data (on one or more pages) in a block associated with each of the RAID grid locations in P Parity RAID grid (406) are arranged in a similar manner to RAID grid A (400), RAID grid B (402), and RAID grid C (404). Further, as described above, the data (on one or more pages) in a block associated with each of the RAID grid locations in the P Parity RAID grid (406) is calculated using data (on one or more pages) in a block associated with one RAID grid location in each of the data grids in the RAID cube (i.e., RAID grid A (400), RAID grid B (402), RAID grid C (404)). For example, data (on one or more pages) in a block associated with RAID grid location <1, 1, 4> in the P Parity RAID grid (406) is determined by applying a P parity function (e.g., an XOR function) to data (on one or more pages) in a block associated one of following RAID grid locations: (i) data (on one or more pages) in a block associated with RAID grid A (400) <1,1,1>, (ii) data from RAID grid B (402) <1,1,2>, and (iii) data (on one or more pages) in a block associated with RAID grid C (404) <1,1,3>. The data (on one or more pages) in a block associated with other RAID grid locations in P Parity RAID grid (406) is calculated in a similar manner.

Referring to FIG. 4C, data (on one or more pages) in a block associated with each of the RAID grid locations in Q Parity RAID grid (408) are arranged in a similar manner to RAID grid A (400), RAID grid B (402), and RAID grid C (404). Further, as described above, the data (on one or more pages) in a block associated with each of the RAID grid locations in Q Parity RAID grid (408) is calculated using data (on one or more pages) in a block associated with one RAID grid location in each of the data grids in the RAID cube (i.e., RAID grid A (400), RAID grid B (402), RAID grid C (404)). For example, the data (on one or more pages) in a block associated with RAID grid location <1, 1, 5> in the Q Parity RAID grid (408) is determined by applying a Q parity function (as described above) to data (on one or more pages) in a block associated with one of the following RAID grid locations: (i) data (on one or more pages) in a block associated with RAID grid A (400) <1,1,1>, (ii) data (on one or more pages) in a block associated with RAID grid B (402) <1,1,2>, and (iii) data (on one or more pages) in a block associated with RAID grid C (404) <1,1,3>. The data (on one or more pages) in a block associated with other RAID grid locations in Q Parity RAID grid (408) is calculated in a similar manner.

Figures 5A, 5B, 5C:
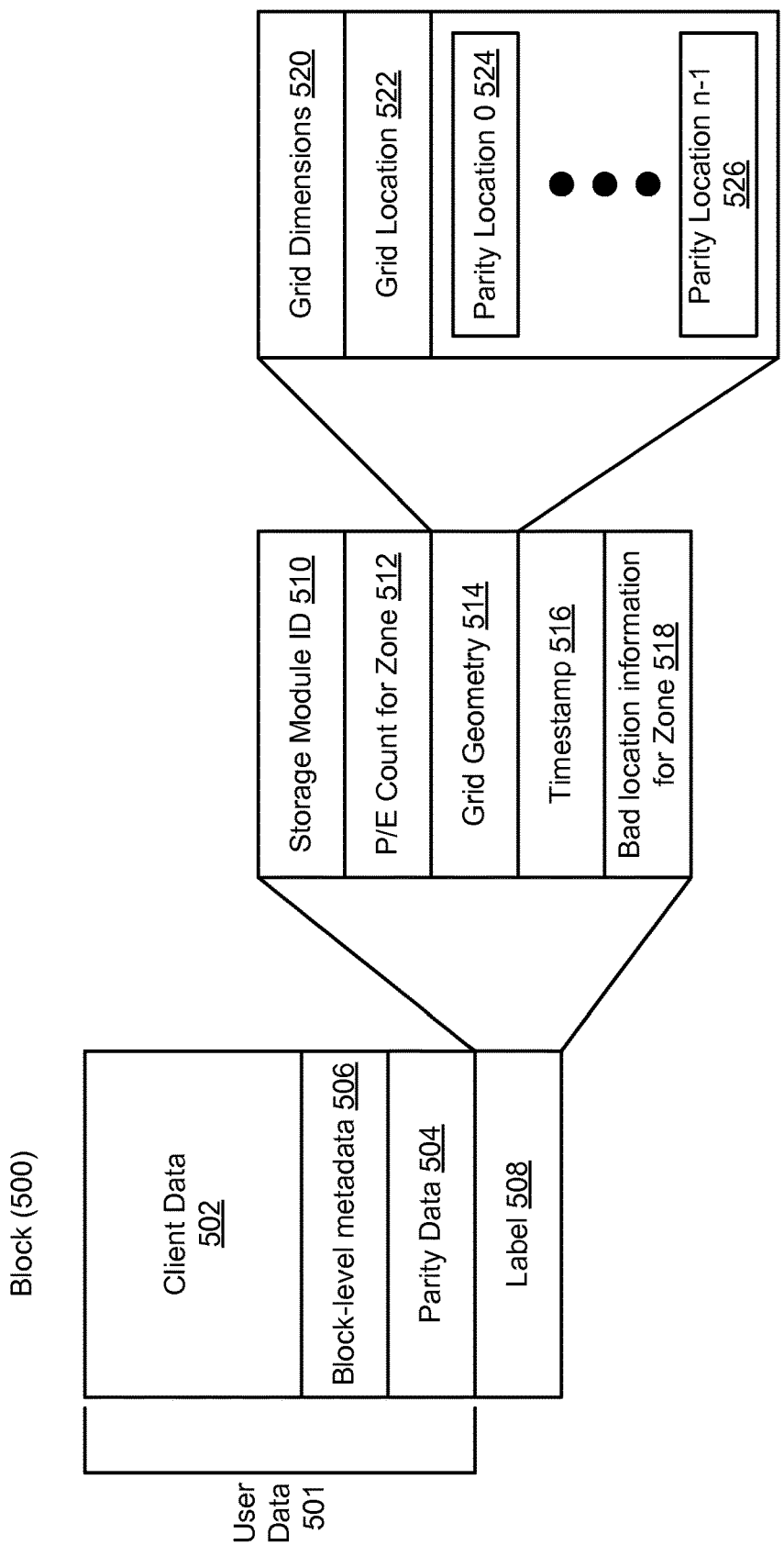
FIGS. 5A-5C show a block in accordance with one or more embodiments of the technology.

FIGS. 5A-5C shows a block (500) in accordance with one or more embodiments of the technology. In one embodiment of the technology, each RAID location in a RAID grid (discussed above) is configured to store a block (500), where the block includes a set of pages. Referring to FIG. 5A, the block (500) includes, at least, one or more pages that include user data (501) and at least one page that includes a label (508). In one embodiment of the technology, the user data (501) may include client data (502), block-level metadata (506) and parity data (504). The user data (501) is stored in one or more pages within the block (500). In one embodiment of the technology, user data (502) corresponds to any data received from a client. In one embodiment of the technology, the block-level metadata (506) includes metadata for the client data (502) stored in the block (500). In one embodiment of the technology, the block-level metadata corresponds to the table of contents entries as described in U.S. Pat. No. 8,370,567, which is hereby incorporated by reference. Continuing with the discussion of FIG. 5A, the parity data (504) includes parity values generated in accordance with the multi-dimensional RAID scheme as described above in FIGS. 2-4D and as described in U.S. Pat. No. 8,327,185, which is hereby incorporated by reference. In one embodiment of the technology, the label (508) corresponds to metadata for a zone (i.e., a portion of a RAID grid) (see e.g., FIG. 6) and/or for the RAID grid in which the block (500) is located. The label (508) may be stored in a separate page within the block (500). Said another way, each block may include at least one page where the only content stored in the page is the label (or a portion thereof). Additional detail about the label (508) is described in FIGS. 5B, 5C and 6.

FIG. 5B shows a label (508) for the block (500) in accordance with one or more embodiments of the technology. As shown in FIG. 5B, the label (508) may include: (i) a storage module ID (510), a P/E count for a zone (512), grid geometry (514), a timestamp (516), and bad location information for a zone (518). Each of these components is described below.

In one embodiment of the technology, the storage module ID (510) specifies the storage module within the storage array (108) on which the label is located. More specifically, the label is originally stored in a block (500) on a storage module (not shown), the storage module ID corresponds to this storage module. In one embodiment of the technology, the storage module ID (508) field is represented using an integer.

In one embodiment of the technology, the program/erase (P/E) count for the zone (512) corresponds to the P/E count for the zone at a specific point in time. The P/E count may represent: (i) the number of P/E cycles that have been performed on the pages within the block (500) or (ii) a P/E cycle range (e.g., 5,000-9,999 P/E cycles), where the number of P/E cycles that have been performed on the pages within the block is within the P/E cycle range. In one embodiment of the technology, a P/E cycle is the writing of data to one or more pages in an erase block (i.e., the smallest addressable unit for erase operations, typically, a set of multiple pages) and the erasure of that block, in either order. In one embodiment of the technology, the control module includes functionality to track the P/E count for each of the blocks in the storage pool.

In one embodiment of the technology, the grid geometry (514) specifies information about the geometry of the RAID grid. Additional details about the grid geometry (514) are described in FIG. 5C.

In one embodiment of the technology, the timestamp (516) corresponds to the time that the label (508) was written to a page within a block (500) in the storage array. The precision of the timestamp may vary based on the implementation of the technology. Further, a sequence number may be used in place of the timestamp without departing from the technology.

In one embodiment of the technology, bad location information for the zone (518) may include: (i) bad storage module information; (ii) bad block information; and/or (iii) bad page information. The bad storage module information specifies which storage modules (that are used to store user data for the particular RAID grid) are available or unavailable to service write requests. The bad block information specifies which blocks within the aforementioned storage modules should not be used to store any data (including user data and a label). A given block may be deemed to be a bad block if data is not able to be successfully erased from, written to, and/or retrieved from a majority (a certain threshold number) of the pages within the block. For example, if data cannot be erased from, written to, and/or retrieved 75% of the pages in a block, then the particular block may be deemed to be a bad block. In another embodiment of the technology, a given block may be deemed to be a bad block based on analysis of other information about the block (or pages within the block) prior to the data within the block being irretrievable or the block being unable to successful store data. For the example, information such as total P/E cycles, raw bit error rates, etc. may be used to proactively mark a given block as a bad block.

In one embodiment of the technology, the bad page information specifies which pages within the aforementioned blocks that are used to store data for the RAID grid should not be used to store any data (including user data and a label). A given page may be deemed to be a bad page if data is not able to be successfully erased from, written to, and/or retrieved from the page more than a threshold value (e.g., 90%) of the time.

The aforementioned bad location information may be encoded using one or more bit maps. For example, there may be a bit map for the bad storage module information, a set of bit maps for the bad block information, and a set of bit maps for the bad page information. The bit maps may use "0" to denote a bad storage module, a bad block, or a bad page and may use a "1" to denote all other storage modules, blocks, and pages. Other bit map encoding schemes may be used without departing from the technology.

Referring to FIG. 5C, the grid geometry (514) may include: (i) grid dimensions field (520), (ii) a grid location (522) field, and (iii) one or more parity locations (524, 526). Each of these components is described below.

In one embodiment of the technology, the grid dimensions (520) information may include the number of rows and columns in the RAID grid and the IFD associated with each of the RAID grid dimensions. In one embodiment of the technology, the grid location (522) field may include the location of the grid within the block (500).

In one embodiment of the technology, the grid geometry includes one parity location (524, 526) for each type of parity in each dimension. For example, if the RAID grid includes P and Q parity in both dimensions, then the grid geometry would include parity locations of the P parity row group, the Q parity row group, the P parity column group, and the Q parity column group. In one embodiment of the technology, the parity locations are specified on a per parity-type (e.g., P, Q. etc.) on a per dimension basis (e.g., row and column). Those skilled in the art will appreciate that embodiments of the technology may be implemented using greater (e.g., using P, Q, and R parity) or fewer parity values (e.g., using P parity) without departing from the technology. Further, those skilled in the art will appreciate that each dimension may include a different number of parity values without departing from the technology.

While FIGS. 5A-5C show various types of data stored in a block, embodiments of the technology may be implemented with blocks that include additional (or different) data and/or a different ordering of data without departing from the technology. Further, the values in the various fields within the label may be encoded using any encoding scheme without departing from the technology.

Figure 6:
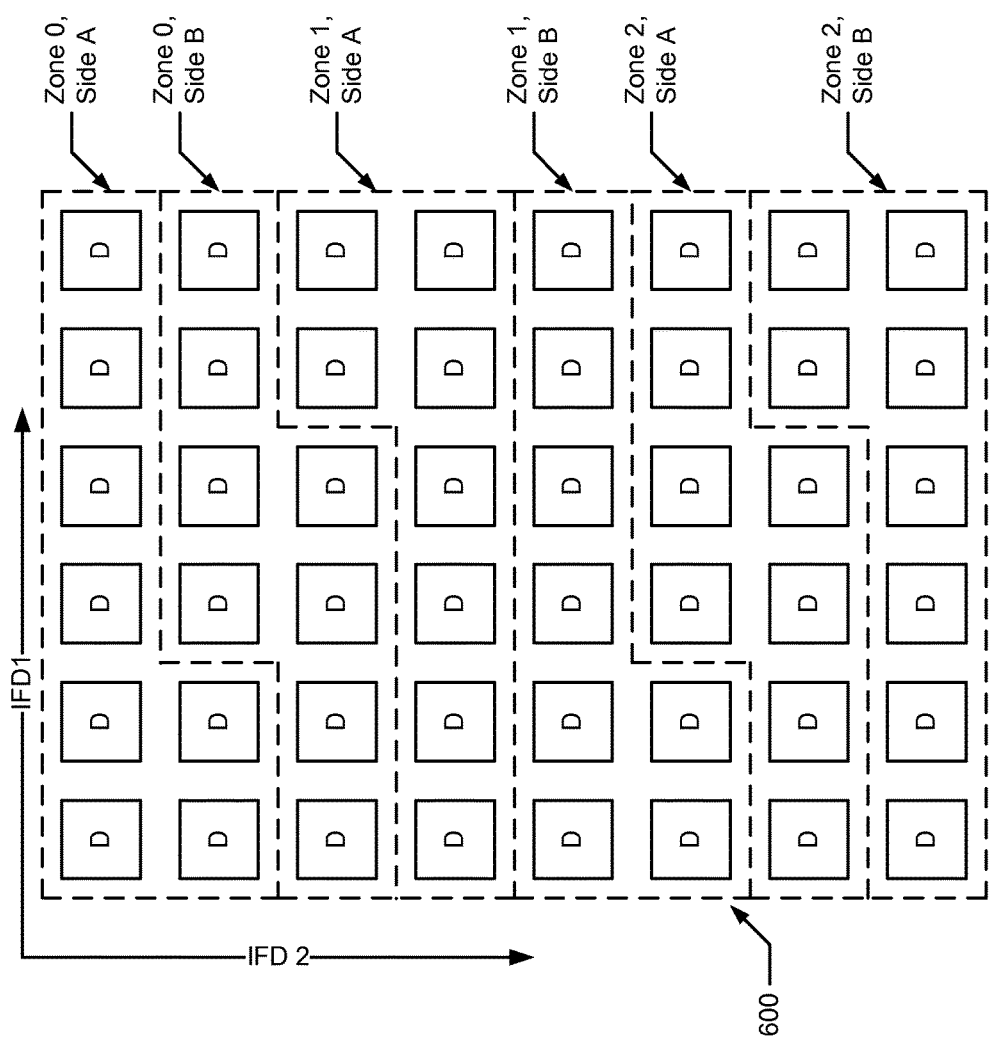
FIG. 6 shows an example in accordance with one or more embodiments of the technology.

FIG. 6 shows an example in accordance with one or more embodiments of the technology. More specifically, FIG. 6 shows an example of the replication scheme used to protect the labels (see FIG. 5, 508) that are stored in the blocks within the RAID grid. Turning to FIG. 6, FIG. 6 shows an exemplary 6×8 RAID grid (600) that includes 48 raid grid locations (C), where a first dimension is based on IFD1 and a second dimension is based on IFD2. In this example, assume that IFD1 corresponds to storage modules and IFD2 corresponds to channels. Further, assume that the amount of replication (R) that is specified for the labels is 16. Accordingly, the number of zones in the RAID grid (600) is 3 (i.e., C/R or 48/16 in the instant example)). Further, because each zone has two sides (denoted side A and side B), the number of RAID grid locations in each side within a zone is 16/2=8.

Figure 8:
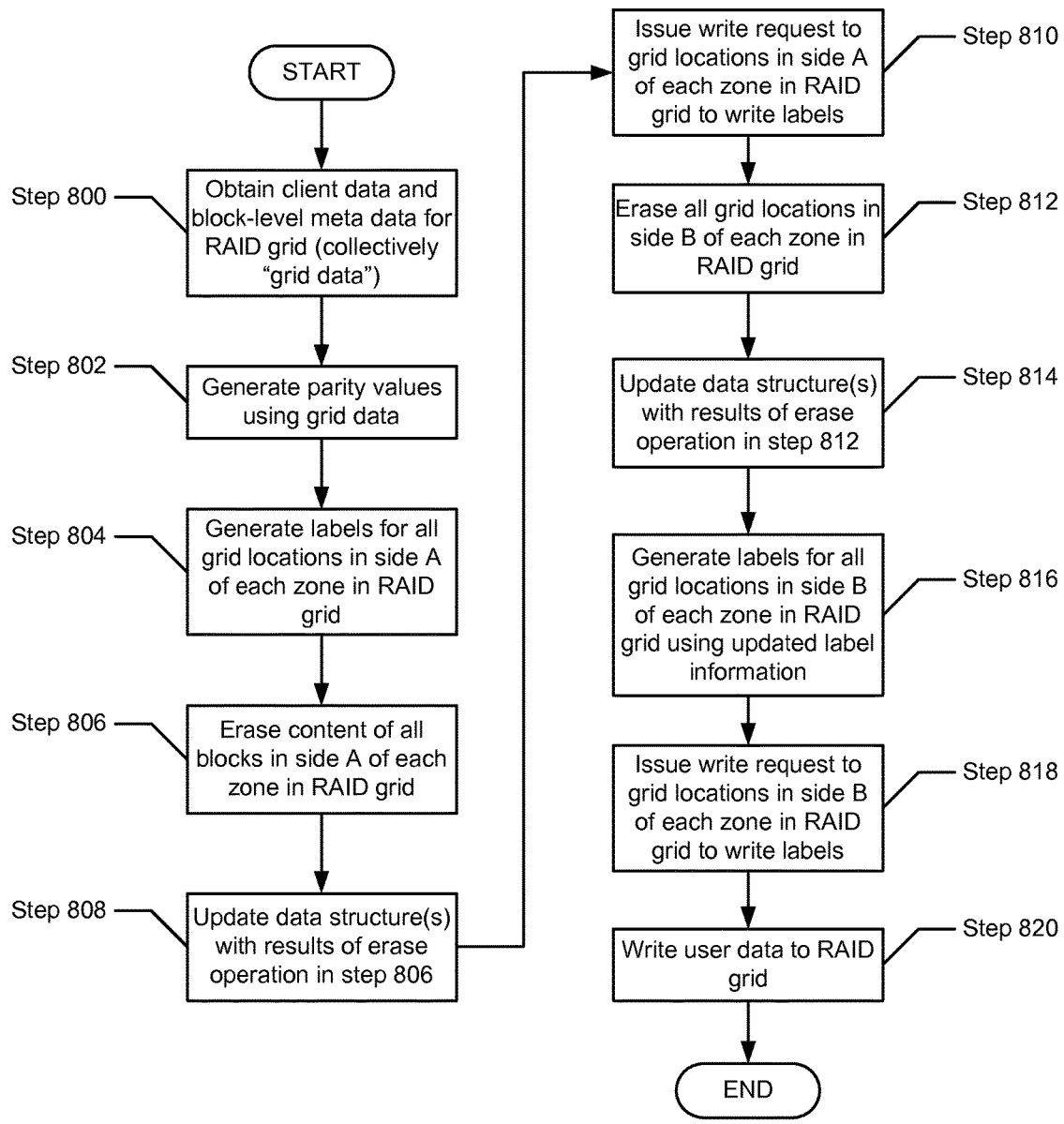
FIGS. 8-9 shows a flow chart in accordance with one embodiment of the technology.

As discussed above, each RAID grid location is associated with a label. However, the contents of the label may vary across labels associated with a given RAID grid. More specifically, in one embodiment of the technology, the label includes label specific metadata (e.g., storage module ID), side-level metadata (e.g., timestamp), zone-level metadata (e.g., P/E count for the zone, bad location information for the zone), and grid-level metadata (e.g., grid geometry). Accordingly, with reference to FIG. 6, there are 48 copies of the grid geometry within the RAID grid and 16 copies of the timestamp within a given zone. Further, within a given zone there are between 8-16 copies of the P/E count for the zone and between 8-16 copies of the bad location information for the zone. With respect to the P/E count of the zone and the bad location information for the zone, this data is updated on a per-side basis within the zone (see FIG. 8). Accordingly, at certain times both sides in a given zone have the same content for P/E count for the zone and the same bad location information for the zone while at other times the two sides within a given zone have different content for the P/E count for the zone and different content for the bad location information for the zone. FIG. 8, described below, provides additional detail about the content of the labels at various times.

Those skilled in the art will appreciate that a given zone may include any amount of replication (R) provided that R≤C (i.e., the number of grid locations) such that each side within a zone includes between R/2 and R−1 RAID grid locations.

The example shown in FIG. 6 and described above is not intended to limit the scope of the technology.

Figure 7:
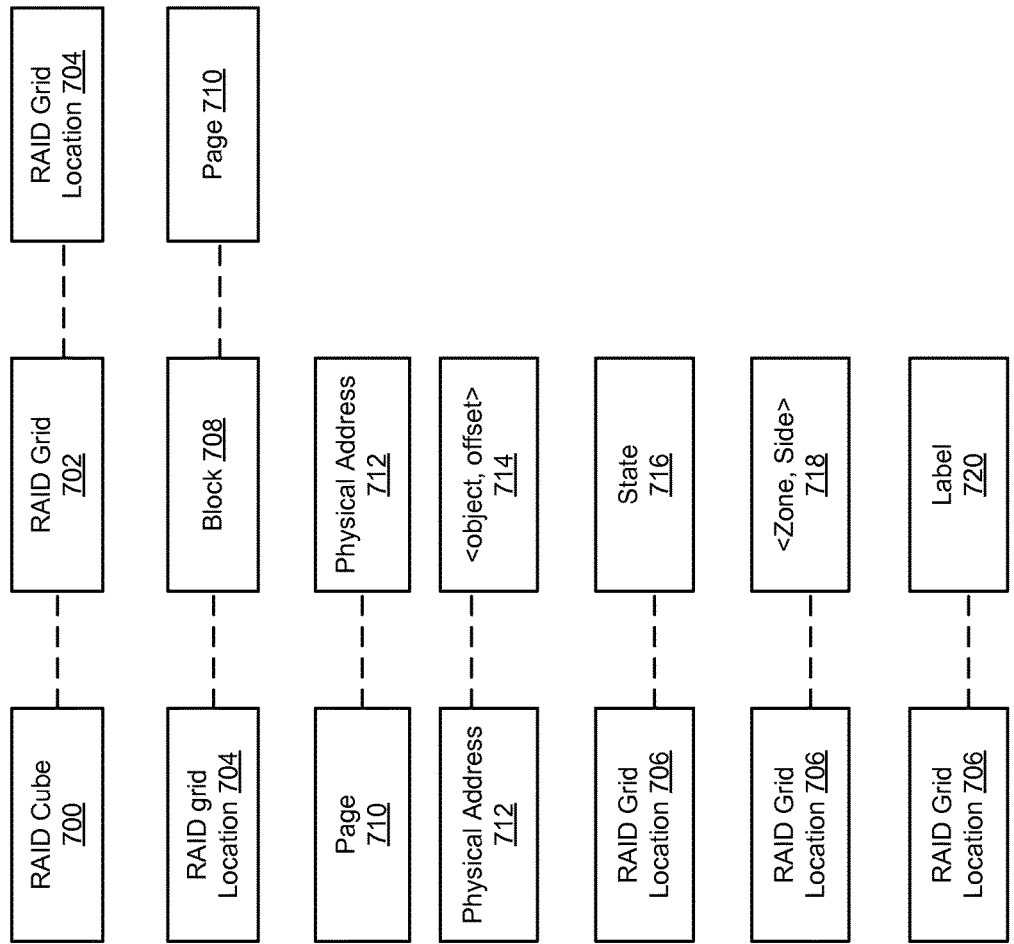
FIG. 7 shows data structures in accordance with one embodiment of the technology.

FIG. 7 shows relationships between various components within the system in accordance with one embodiment of the technology. In one embodiment of the technology, the controller includes one or more data structures to track information about the various components and/or information about the relationships between the one or more components.

In one embodiment of the technology, each RAID grid (702) includes one or more RAID grid locations (704). Further, each RAID grid (702) may be associated with a RAID cube (700) in the event that the controller implements a 3D RAID scheme. Further, each RAID grid location (704) is associated with a block (708), where each block is further associated with one or more pages (710). Each of the pages (710) is associated with a physical address (712). Further, though not shown in FIG. 7, each page (710) is also associated with a RAID grid layer (see e.g., FIG. 2).

In one embodiment of the technology, the controller tracks the mappings between data provided by the client and the physical address of such data in the storage array. In one embodiment of the technology, the controller tracks the aforementioned information using a mapping between a logical address e.g., <object, offset> (714), which identifies the data from the perspective of the client, and a physical address (712), which identifies the location of the data within the storage array. In one embodiment of the technology, the mapping may be between a hash value derived from applying a hash function (e.g., MD5, SHA 1) to <object, offset> and the corresponding physical address (712). Those skilled in the art will appreciate that any form of logical address may be used without departing from the technology. In one embodiment of the technology, the physical address (712) to logical address (714) mapping is determined using block-level meta. In one embodiment of the technology, the aforementioned mapping is determined in accordance with the methods described in U.S. Pat. No. 8,370,567.

In one embodiment of the technology, the controller tracks which RAID grid (including RAID grids in the data portion and the parity portion) (702) is associated with which RAID cube (700) (assuming that the controller is implementing a 3D RAID scheme) and also which RAID grid locations (704) are associated with each RAID grid (702).

In one embodiment of the technology, the controller tracks the state (716) of each RAID grid location (706). In one embodiment of the technology, the state (716) of a RAID grid location may be set as filled (denoting that a block has been written to the RAID grid location) or empty (denoting that nothing has been written to the RAID grid location). In one embodiment of the technology, the controller may also set the state of the RAID grid location to filled if the controller has identified data to write to the RAID grid location (see FIG. 8). When the RAID grid is initially created, the controller may initially set the state of each RAID grid location to empty.

In one embodiment of the technology, the controller tracks to which <zone, side> (718) each RAID grid location (706) is associated. In one embodiment of the technology, the controller tracks the content of each label (720) (see e.g., FIG. 5A-5C) that is associated with each of the RAID grid locations.

Figure 9:
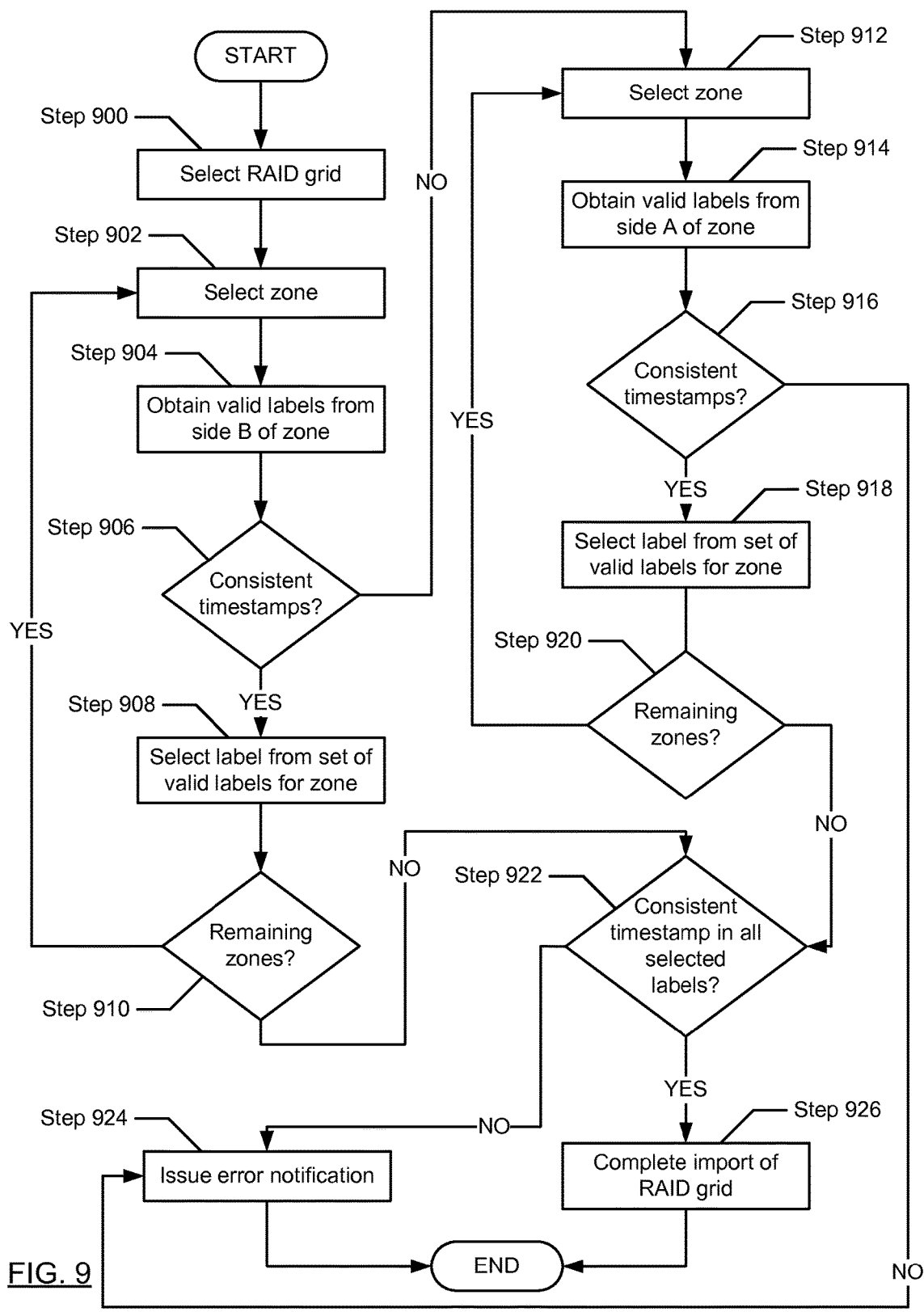

FIGS. 8-9 show flowcharts in accordance with one or more embodiments of the technology. More specifically, While the various steps in the flowchart are presented and described sequentially, one of ordinary skill will appreciate that some or all of the steps may be executed in different orders, may be combined or omitted, and some or all of the steps may be executed in parallel. In one embodiment of the technology, the methods shown in FIGS. 8-9 may be performed in parallel.

Referring to FIG. 8, FIG. 8 shows a method for storing data in the storage array in accordance with one or more embodiments of the technology.

In step 800, the client data and the block-level metadata for a RAID grid are obtained. In one embodiment of the technology, the client data may be obtained through a series of write requests from a client. Further, obtaining the block-level metadata may include generating the block-level metadata after the client data is received, for example, in accordance with U.S. Pat. No. 8,370,567.

In step 802, parity values are generated using the block-level metadata and client data obtained in step 800. Parity values may be generated in accordance with a multi-dimensional RAID scheme, such as the one described above.

In step 804, labels for each RAID grid location in side A for each zone in the RAID grid are generated. The labels include the content as described above, for example, with respect to FIGS. 5A-5C and 6. The content of the labels generated in step 804 is based on the current values for at least P/E count for the zone and the bad location information for the zone that are maintained by the controller. More specifically, the P/E count for the zone and the bad location information for the zone were determined during the last time data (including user data and labels) were written to the blocks within the zone.

In step 806, the content of all blocks associated with RAID grid locations for side A of each zone is erased.

In step 808, the result of the erase operation is used to update one or more data structures maintained by the controller. More specifically, the P/E count for side A for all zones and the bad block information for side A for all zones in the RAID grid may be updated. For example, the erase operation may result in an update of the P/E count and the bad block information may be updated in the event that the erase operation fails for a given a block.

In step 810, writes are issued to RAID grid locations associated with side A in all zones within the RAID grid. More specifically, one page that includes the corresponding label is written to each RAID grid location that is associated with side A for each zone in the RAID grid.

In step 812, the content of all blocks associated with RAID grid locations for side B of each zone is erased.

In step 814, the result of the erase operation is used to update one or more data structures maintained by the controller. More specifically, the P/E count for side B for all zones and the bad block information for side B for all zones in the RAID grid may be updated. For example, the erase operation may result in an update of the P/E count and the bad block information may be updated in the event that the erase operation fails for a given block. At this stage, the current P/E count for the zone and the current bad block information for the zone is available to the controller. Said another way, in step 808 only a portion of the current P/E count for each zone is known as only updated information for RAID grid locations associated with side A of each zone is available (i.e., because an erase operation was only performed on RAID grid locations associated side A for a given zone).

In step 816, labels for each RAID grid location in side B for each zone in the RAID grid is generated. The labels include the content as described above, for example, with respect to FIGS. 5A-5C and 6. The content of the labels generated in step 804 is based on the current values for at least P/E count for the zone and bad location information for the zone that are maintained by the controller (i.e., the updated content obtained, at least in part, in steps 808 and 814).

In step 818, write issued to RAID grid locations associated with side B in all zones within the RAID grid. More specifically, one page that includes the corresponding label is written to each RAID grid location that is associated with side B for each zone in the RAID grid.

In step 820, the corresponding user data (e.g., 501 in FIG. 5) is written to the RAID grid.

Referring to FIG. 9, FIG. 9 shows a method for importing data from a RAID grid in accordance with one or more embodiments of the technology. More specifically, FIG. 9 shows a method for determining whether previously stored content from the storage modules is valid and, if it is valid, then importing appropriate portions of the content into the memory of the storage controller. The method shown in FIG.

9 may occur when the controller (and/or other components in the system) lose power and then are subsequently powered back-up.

Turning to FIG. 9, assume that power has been restored to the system. Once power has been restored, the process may proceed (directly or after other steps (not shown) related to restarting the system have been performed) to step 900. In step 900, a RAID grid is selected. In step 902, a zone within the RAID grid is selected.

In step 904, a valid label is obtained from each of the blocks in side B of the selected zone. In one embodiment of the technology, a valid label may not be obtained from each block in side B of the selected zone. In one embodiment of the technology, a valid label corresponds to a label that may be successfully read from the storage array.

In step 906, a determination is made about whether at least the timestamps in each of the valid labels is consistent. If the labels (and/or other content within the labels) (e.g., grid geometry, bad location information, etc.) is not consistent (i.e., the same), then the process proceeds to step 908; alternatively, the process proceeds to step 912.

In step 908, a label from the valid set of labels obtained in step 904 is selected. In step 910, a determination is made about whether there are additional zones in the RAID grid to process. If there are additional zones in the RAID grid to process, then the process proceeds to step 902; otherwise, the process proceeds to step 922.

Retuning to step 906, if at least the timestamps in each of the valid labels is not consistent, then the process proceeds to step 912. In step 912, a zone in the RAID grid is selected. In step 914, a valid label is obtained from each of the blocks in side A of the selected zone from step 912. In one embodiment of the technology, a valid label may not be obtained from each block in side A of the selected zone.

In step 916, a determination is made about whether at least the timestamps in each of the valid labels is consistent. If the labels (and/or other content within the labels) (e.g., grid geometry, bad location information, etc.) is not consistent (i.e., the same), then the process proceeds to step 924; alternatively, the process proceeds to step 918.

In step 918, a label from the valid set of labels obtained in step 914 is selected.

In step 920, a determination is made about whether there are additional zones in the RAID grid to process. More specifically, the determination is step 920 is based on whether there are other zones in the RAID grid for which the labels associated with side A of the zone have not been processed. If there are additional zones in the RAID grid to process, then the method proceeds to step 912; otherwise, the process proceeds to step 922. In one embodiment of the technology, the process may only proceed to step 922 if either (i) a valid label from side B has been identified for each zone in steps 902-910, or (ii) a valid label from side B has been identified for each zone in steps 912-920.

In step 922, a determination is made about whether at least the timestamps in each of the selected labels (obtained in step 908 or 918) is consistent. If the labels (and/or other content within the labels) (e.g., grid geometry, bad location information, etc.)) is not consistent (i.e., the same), then the process proceeds to step 924; alternatively, the process proceeds to step 926.

In one embodiment of the technology, steps 902-910 and 912-920 ensure that labels within a given side of a particular zone are consistent, while step 922 ensures that labels across the entire RAID grid are consistent. In one embodiment of the technology, because the labels for a given side in all zones in a RAID grid should have at least the same timestamp (based on the manner in which they are written to the storage array, see e.g., FIG. 8), the validity of the labels may be determined based, at least in part, on the fact that the labels for a given side for all zones in a RAID grid should have the same timestamp. If they do not, then the labels are not consistent. Further, because each label only includes a portion of the grid-level metadata (see FIGS. 5A-5C), in order to reconstruct the grid-level metadata for a RAID grid, a valid label must be obtained from each zone in the RAID grid and each of these labels must have the same timestamp. The consistency of at least the timestamp ensures that the content of the labels is properly combinable (i.e., the content of each of the selected labels corresponds to a portion of the same RAID grid (i.e., a RAID grid at a particular time)).

Returning to FIG. 9, in step 926, importing of the RAID grid is completed. Importing of the RAID grid may include importing the information from the labels in order to determine, for example, the RAID grid geometry and the location of the various parity values within the RAID grid. The importing may further include generating one or more of the data structures described with respect to FIG. 6. In one embodiment of the technology, without the information from the labels, the controller would not have sufficient information about how user data is stored in the storage array and, as such, would not be able to retrieve this information and/or implement the multi-dimensional RAID scheme.

Returning to FIG. 9, if a consistent set of valid labels is not obtained, then in step 924, then there is not sufficient information to import the RAID grid and, as such, as an error notification is issued to the appropriate individual(s), entities, etc.

Embodiments of the technology provide a mechanism for storing grid-level metadata (i.e., labels) and user data within a storage pool using two different mechanisms—replication and a multidimensional RAID scheme, respectively. Further, the manner in which the aforementioned data is stored in the storage array is self-describing. Specifically, the labels provide grid-level and zone-level metadata, which enables the recovery of the grid geometry (and other information) that is required to at least implement the multidimensional RAID scheme. Further, within each block there are one or more pages that include user data (including block-level metadata), where the block-level metadata is used to populate one or more data structure. These data structures may then be used to obtain the user data stored within the storage array.

Those skilled in the art will appreciate that while various examples of the technology have been described with respect to storing data in a storage array along IFDs and/or storing data in NAND flash, embodiments of the technology may be implemented on any multi-dimensional disk array without departing from the technology. For example, one or more embodiments of the technology may be implemented using a two dimensional array of storage devices (magnetic, optical, solid state, or any other type of storage device), where data for each RAID grid location in a RAID grid is stored on a separate disk.

Further, in one embodiment of the technology, in the event that the controller is implementing a 3D RAID scheme using a three dimensional array of disks, the controller may store data for each of the RAID grid locations using the following n-tuple: <disk x, disk y, disk z, logical block address (LBA) a>, where x, y, and z are the dimensions of the disk array.

The above examples for implementing embodiments of the technology using a two-dimensional disk array are not intended to limit the scope of the technology.

Those skilled in the art will appreciate that while the technology has been described with respect to a 2D RAID scheme and a 3D RAID scheme, embodiments of the technology may be extended to any multi-dimensional RAID scheme.

One or more embodiments of the technology may be implemented using instructions executed by one or more processors in the system. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data comprising:
   (a) generating a first plurality of labels each comprising a first program/erase (P/E) count for a first zone in a RAID grid and first bad location information for the first zone, wherein the first zone comprises a first set of RAID grid locations and a second set of RAID grid locations, wherein the first zone is divided into a first side and a second side, wherein the first side comprises the first set of RAID grid locations and the second side comprises the second set of RAID grid locations, wherein the first set of RAID grid locations corresponds to at least a page in a first storage device of a storage array and a second page in a second storage device of the storage array;
   (b) erasing each of the first set of RAID grid locations;
   (c) writing one of the first plurality of labels to at least one page in each of the first set of RAID grid locations;
   (d) erasing each of the second set of RAID grid locations, wherein (b) and (c) are performed before (d);
   (e) generating a second plurality of labels each comprising a second program/erase (P/E) count for the first zone in the RAID grid and second bad location information for the first zone, wherein content in the second plurality of labels is based, at least in part, on (b) and (d);
   (f) writing one of the second plurality of labels to at least one page in each of the second set of RAID grid locations; and
   (g) writing user data to each of the first set of RAID grid locations and each of the second set of RAID grid locations, wherein the user data comprises client data, block-level metadata, and parity data, wherein after (g), at least one of the first set of RAID grid locations comprises a block, wherein at least one page in the block comprises user data and at least one page in the block comprises one of the first plurality of labels.

2. The method of claim 1, further comprising:
   (h) generating a third plurality of labels each comprising a third P/E count for a second zone in the RAID grid and third bad location information for the second zone;
   (i) erasing each of a third set of RAID grid locations, wherein each of the third set of RAID grid locations comprises a block associated with a first side of the second zone;
   (j) writing one of the third plurality of labels to each of the third set of RAID grid locations;
   (k) erasing each of a fourth set of RAID grid locations, wherein each of the fourth set of RAID grid locations comprises a block associated with a second side of the second zone;
   (l) generating a fourth plurality of labels each comprising a fourth P/E count for the second zone in the RAID grid and fourth bad location information for the second zone;
   (m) writing one of the fourth plurality of labels to each of the fourth set of RAID grid locations; and
   (n) writing user data to each of the third set of RAID grid location and each of the fourth set of RAID grid locations.

3. The method of claim 2, wherein each of the first plurality of labels further comprises a timestamp and wherein each of the third plurality of labels further comprises the timestamp.

4. The method of claim 1, wherein the parity value comprises at least one selected from a group consisting of a P parity value, a Q parity value, and an intersection parity value.

5. The method of claim 1, wherein the user data in the RAID grid is protected by a RAID-scheme, wherein the first plurality of labels in the RAID grid are protected by a replication-scheme.

6. The method of claim 1, wherein the second bad location information for the first zone comprises at least one selected from a group consisting of bad storage module information, bad block information, and bad page information.

7. The method of claim 1, wherein the second bad location information is different than the first bad location information.

8. The method of claim 1, wherein (c) and (f) are performed before (g).

9. The method of claim 1, wherein each of the first plurality of labels comprises a grid geometry for the RAID grid and wherein the grid geometry comprises a parity location in the RAID grid.

10. The method of claim 9, wherein each of the second plurality of labels comprises the grid geometry for the RAID grid.

11. The method of claim 1, wherein the first set of RAID grid locations are a portion of a RAID grid and the second set of RAID grid locations are a portion of the RAID grid.

12. The method of claim 1, wherein the second set of RAID grid locations correspond to at least a page in a third storage device of the storage array and a page in a fourth storage device of the storage array.

13. A non-transitory computer readable medium comprising computer readable program code, which when executed by a computer processor enables the computer processor to:
   (a) generate a first plurality of labels each comprising a first program/erase (P/E) count for a first zone in a RAID grid and first bad location information for the first zone, wherein the first zone comprises a first set of RAID grid locations and a second set of RAID grid locations, wherein the first zone is divided into a first side and a second side, wherein the first side comprises the first set of RAID grid locations and the second side comprises the second set of RAID grid locations, wherein the first set of RAID grid locations corresponds to at least a page in a first storage device of a storage array and a second page in a second storage device of the storage array;
   (b) erase each of the first set of RAID grid locations;
   (c) write one of the first plurality of labels to at least one page in each of the first set of RAID grid locations;

(d) erase each of the second set of RAID grid locations, wherein (b) and (c) are performed before (d);

(e) generate a second plurality of labels each comprising a second program/erase (P/E) count for the first zone in the RAID grid and second bad location information for the first zone, wherein content in the second plurality of labels is based, at least in part, on (b) and (d);

(f) write one of the second plurality of labels to at least one page in each of the second set of RAID grid locations; and (g) write user data to each of the first set of RAID grid locations and each of the second set of RAID grid locations, wherein the user data comprises client data, block-level metadata, and parity data, wherein after (g), at least one of the first set of RAID grid locations comprises a block, wherein at least one page in the block comprises user data and at least one page in the block comprises one of the first plurality of labels.

14. The non-transitory computer readable medium of claim 13, further comprising computer readable program code, which when executed by the computer processor enables the computer processor to:

(h) generate a third plurality of labels each comprising a third P/E count for a second zone in the RAID grid and third bad location information for the second zone;

(i) erase each of a third set of RAID grid locations, wherein each of the third set of RAID grid locations comprises a block associated with a first side of the second zone;

(j) write one of the third plurality of labels to each of the third set of RAID grid locations;

(k) erase each of a fourth set of RAID grid locations, wherein each of the fourth set of RAID grid locations comprises a block associated with a second side of the second zone;

(l) generate a fourth plurality of labels each comprising a fourth P/E count for the second zone in the RAID grid and fourth bad location information for the second zone;

(m) write one of the fourth plurality of labels to each of the fourth set of RAID grid locations; and (n) write second user data to each of the third set of RAID grid location and each of the fourth set of RAID grid locations.

15. The non-transitory computer readable medium of claim 13, wherein each of the first plurality of labels further comprises a timestamp and wherein each of the third plurality of labels further comprise the timestamp.

16. The non-transitory computer readable medium of claim 13, wherein the parity value comprises at least one selected from a group consisting of a P parity value, a Q parity value, and an intersection parity value.

17. The non-transitory computer readable medium of claim 13, wherein the second bad location information is determined, at least in part, using a result of (b) and (d) and wherein the second bad location information for the first zone comprises at least one selected from a group consisting of bad storage module information, bad block information, and bad page information.

18. The non-transitory computer readable medium of claim 13, wherein (c) and (f) are performed before (g).

19. The non-transitory computer readable medium of claim 13, wherein each of the first plurality of labels comprises a grid geometry for the RAID grid, wherein each of the second plurality of labels comprises the grid geometry for the RAID grid, and wherein the grid geometry comprises a parity location in the RAID grid.

20. A system, comprising:

a controller;

a non-transitory medium operatively connected to the controller;

persistent storage operatively connected to the controller and comprising a plurality of storage modules, wherein each of the plurality of storage modules comprises solid state memory;

wherein the non-transitory computer readable medium comprises instructions which when executed by the controller performs a method, the method comprising:

(a) generating a first plurality of labels each comprising a first program/erase (P/E) count for a first zone in a RAID grid and first bad location information for the first zone, wherein the first zone comprises a first set of RAID grid locations and a second set of RAID grid locations, wherein the first zone is divided into a first side and a second side, wherein the first side comprises the first set of RAID grid locations and the second side comprises the second set of RAID grid locations, wherein the first set of RAID grid locations corresponds to at least a page in a first storage device of a storage array and a second page in a second storage device of the storage array;

(b) erasing each of the first set of RAID grid locations;

(c) writing one of the first plurality of labels to at least one of each of the first set of RAID grid locations;

(d) erasing each of a second set of RAID grid locations, wherein (b) and (c) are performed before (d);

(e) generating a second plurality of labels each comprising a second program/erase (P/E) count for the first zone in the RAID grid and second bad location information for the first zone, wherein content in the second plurality of labels is based, at least in part, on (b) and (d);

(f) writing one of the second plurality of labels to at least one page in each of the second set of RAID grid locations; and (g) writing user data to each of the first set of RAID grid locations and each of the second set of RAID grid locations, wherein the user data comprises client data, block-level metadata, and parity data, wherein after (g), at least one of the first set of RAID grid locations comprises a block, wherein at least one page in the block comprises user data and at least one page in the block comprises one of the first plurality of labels, and wherein each of the blocks is located on one of the plurality of storage modules.

* * * * *